(12) United States Patent
Lopez

(10) Patent No.: US 6,565,106 B2
(45) Date of Patent: May 20, 2003

(54) BICYCLE SIDECAR

(76) Inventor: Zenon Lopez, 761 W. Betty Ave., Pahrump, NV (US) 89060

( * ) Notice: Subject to any disclaimer, the term of this patent is extended or adjusted under 35 U.S.C. 154(b) by 0 days.

(21) Appl. No.: 09/957,794

(22) Filed: Sep. 21, 2001

(65) Prior Publication Data

US 2003/0057674 A1 Mar. 27, 2003

(51) Int. Cl.$^7$ ................................................ B62K 27/12
(52) U.S. Cl. .................... 280/203; 280/288.1; 280/287; 280/292
(58) Field of Search .............................. 280/473, 288.1, 280/287, 288.4, 292, 259, 202, 203

(56) References Cited

U.S. PATENT DOCUMENTS

| | | | |
|---|---|---|---|
| 3,704,899 A | | 12/1972 | Clem, II |
| 4,378,121 A | | 3/1983 | Rans |
| D277,744 S | * | 2/1985 | Traylor ........................ D12/111 |
| 4,789,173 A | * | 12/1988 | Lofgren et al. ......... 280/281 LP |
| 5,248,158 A | | 9/1993 | Ellard |
| 5,284,351 A | * | 2/1994 | Fleishman ................... 280/259 |
| 5,292,142 A | | 3/1994 | Vitarelli |
| 5,465,989 A | * | 11/1995 | Grove .......................... 280/250 |
| 5,486,015 A | * | 1/1996 | Lau .............................. 280/236 |
| 5,584,494 A | * | 12/1996 | Krumm .................... 280/288.1 |
| 5,607,171 A | * | 3/1997 | Labranche ............... 280/288.1 |
| 5,887,882 A | * | 3/1999 | Atchison .................. 280/288.1 |

* cited by examiner

Primary Examiner—Avraham Lerner
(74) Attorney, Agent, or Firm—Sturm & Fix LLP

(57) ABSTRACT

A wheeled vehicle with a front wheel drive system and a low profile operator seat that is positioned forward of the rear fork. The rear portion of the frame is telescopically connected to and selectively movable with respect to the front portion of the frame to provide a convenient adjustment that accommodates riders of all sizes. The wheeled vehicle also includes a releasably attached sidecar that can be quickly attached to or released from the vehicle frame by mating engagement of a slotted bracket with a rod, and a locking pin with a spring biased socket.

7 Claims, 3 Drawing Sheets

BICYCLE SIDECAR

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The present invention relates to the field of bicycle accessories, and more particularly to a sidecar for bicycles.

2. Description of Related Art

As can be seen by reference to the following U.S. Pat. Nos. 3,704,899; 4,378,121; 5,248,158 and 5,292,142, the prior art is replete with myriad and diverse sidecars for bicycles.

While all of the aforementioned prior art constructions are more than adequate for the basic purpose and function for which they have been specifically designed, they are uniformly deficient with respect to their failure to provide a simple, efficient, and practical bicycle sidecar that is conveniently attached and removed from the bicycle.

As a consequence of the foregoing situation, there has existed a longstanding need for a new and improved bicycle sidecar and the provision of such a construction is a stated objective of the present invention.

BRIEF SUMMARY OF THE INVENTION

Briefly stated, the present invention provides a wheeled vehicle with a front wheel drive system and a low profile operator seat that is positioned forward of the rear fork. The rear portion of the frame is telescopically connected to and selectively movable with respect to the front portion of the frame to provide a convenient adjustment that accommodates riders of all sizes. The wheeled vehicle also includes a releasably attached sidecar that can be quickly attached to or released from the vehicle frame by mating engagement of a slotted bracket with a rod, and a locking pin with a spring biased socket.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings, wherein.

DETAILED DESCRIPTION OF THE INVENTION

Figure 1:
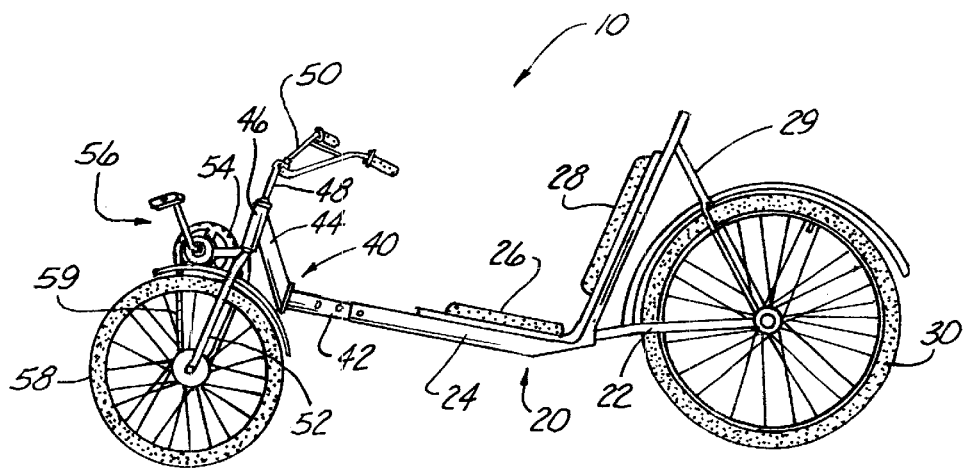
FIG. 1 is a left side elevational view of the wheeled vehicle of the present invention.

As can be seen by reference to the drawings, and in particularly to FIG. 1, the bicycle that forms the basis of the present invention is designated generally by the reference number 10. The bicycle 10 includes a frame having a rear portion 20 with a rear fork 22 and a forwardly extending tube 24. The tube 24 supports a horizontal seat 26 with an upwardly extending seat back 28 supported by brace 29. A rear wheel 30 is rotatably attached to the rear fork 22. The frame also includes a front portion 40 having a tube 42 and an upwardly extending support 44 that carries a sleeve 46 at its upper end. A shaft 48 is journalled for pivotal movement in the sleeve 46. The upper end of the shaft 48 supports steering handle bars 50 and the lower end carries the front fork 52. A bracket 54 extends from the front fork 52 and supports a rotatable pedal crank 56. A front wheel 58 is rotatably attached to the front fork 52 and is drivably connected to the pedal crank 56 by a continuous chain 59.

Figure 2:
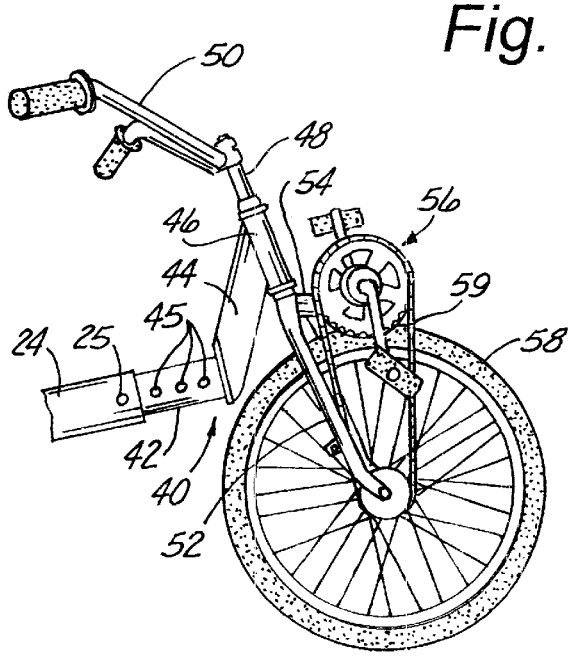
FIG. 2 is an enlarged partial right side elevational view of the vehicle.
Figure 3:
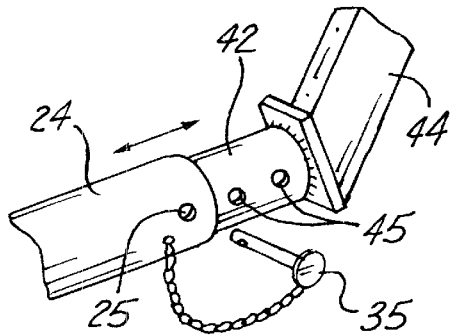
FIG. 3 is a greatly enlarged partial perspective view showing the telescopic connection and adjustment of the rear and front portions of the frame.
Figure 4:
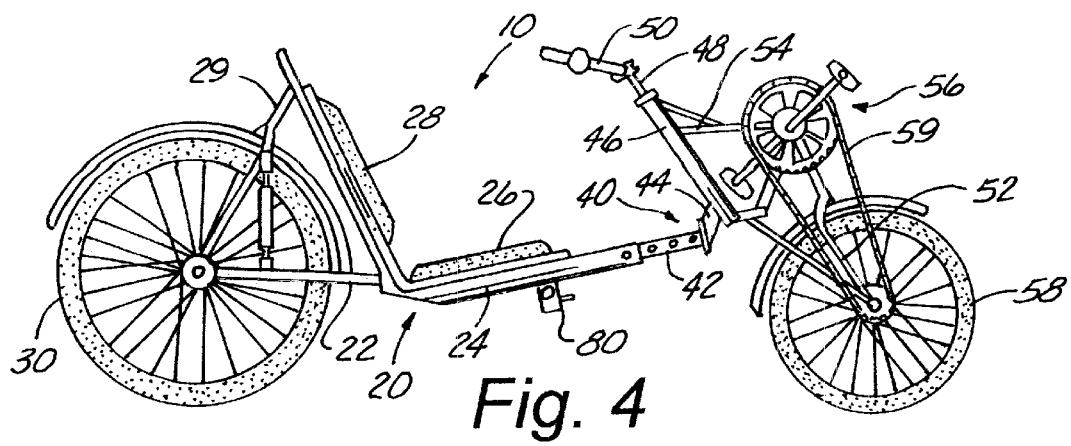
FIG. 4 is a right side elevational view of the wheeled vehicle of the present invention adapted to releasably receive a sidecar.

As best shown in FIGS. 2 and 3, the tube 42 of the front frame portion 40 is telescopically received in the tube 24 of the rear frame portion 20. The frame portions 20 and 40 are thus telescopically movable between an extended position and a retracted position as indicated by the directional arrow in FIG. 3. Also, the frame portions 20 and 40 include registerable openings 25 and 45 that selectively receive pin 35 to secure the frame portions 20 and 40 in a selected position.

Figure 5:
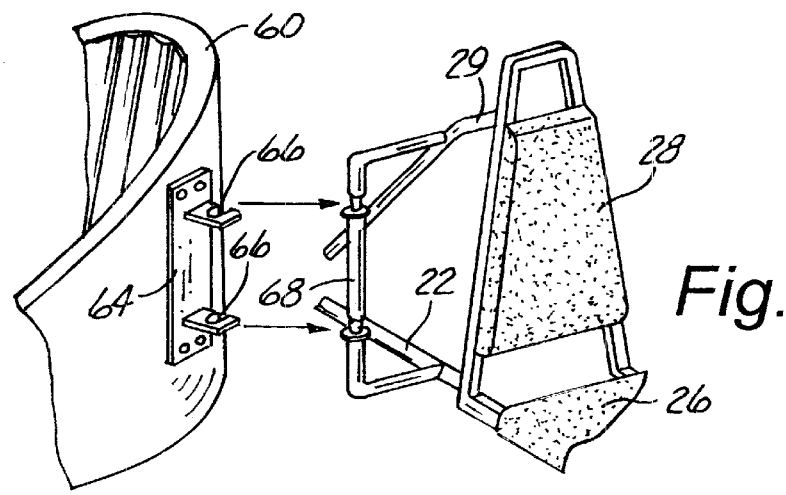
FIG. 5 is an enlarged partial perspective view showing the mating engagement of the rear slotted bracket of the sidecar to the vertical rod attached to the rear portion of the frame.
Figure 6:
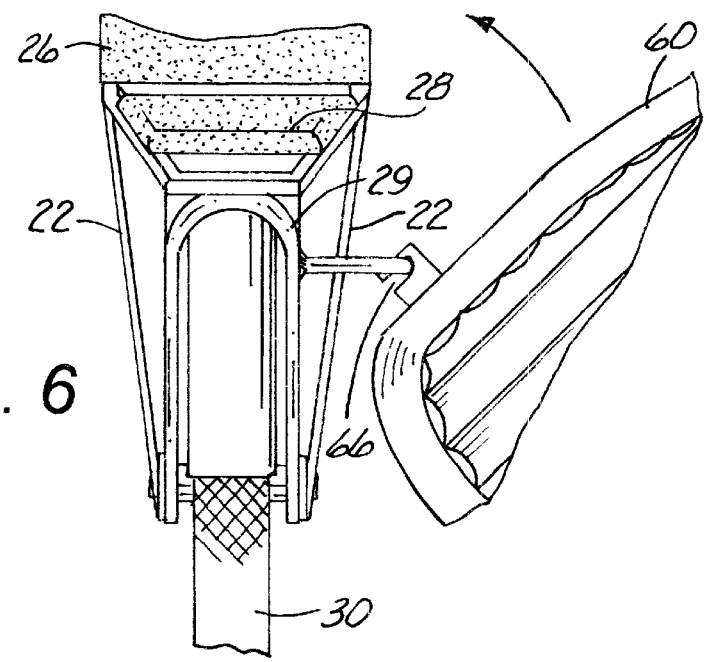
FIG. 6 is a partial top plan view showing the engagement of the slotted bracket and the rod.
Figure 7:
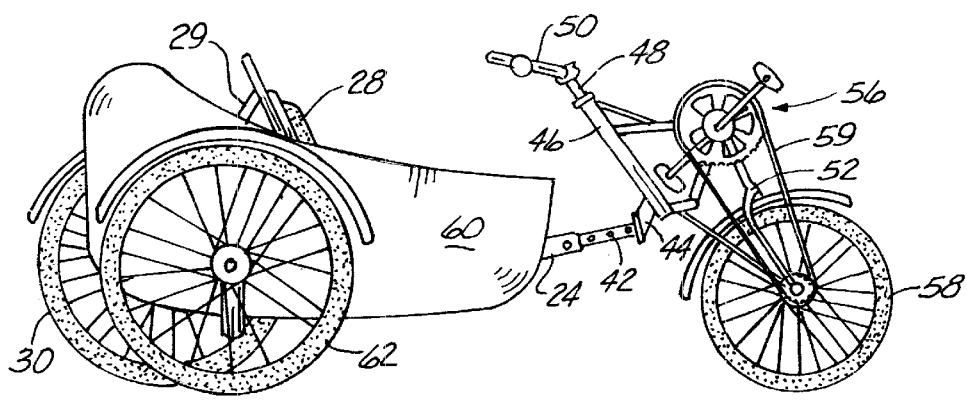
FIG. 7 is a right side elevational view showing the sidecar attached to the vehicle.
Figures 8, 9:
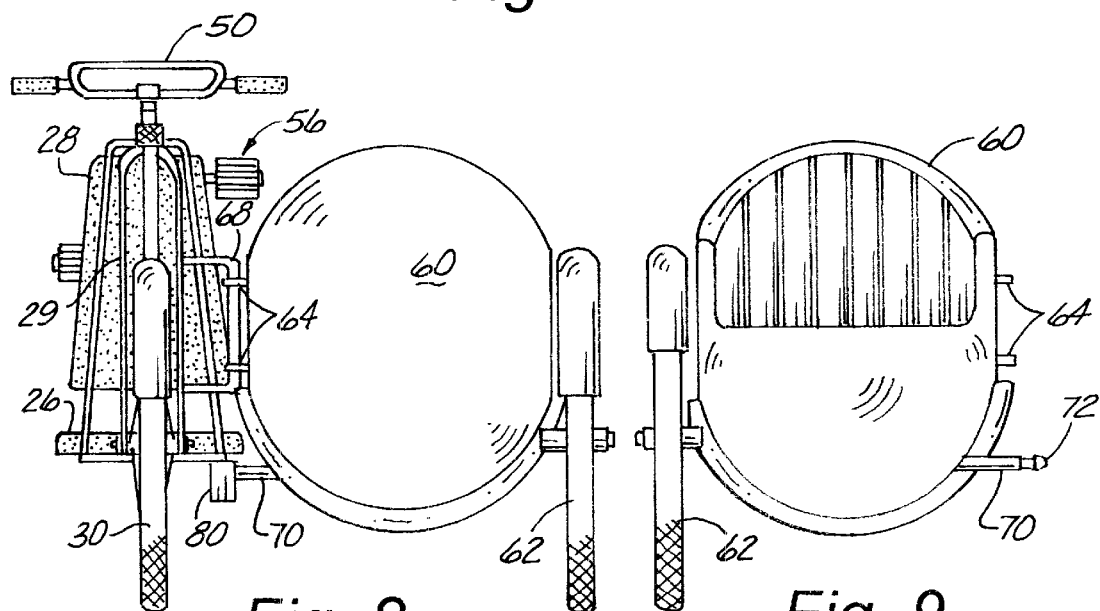
FIG. 8 is a rear elevational view thereof.
FIG. 9 is a front elevational view of the sidecar detached from the vehicle.

A sidecar attachment 60 to the bicycle 10 is illustrated in FIGS. 4–11. The proximal side of the sidecar 60 is attached to the rear portion 20 of the bicycle frame and the distal side is supported by a groundwheel 62. As best shown in FIGS. 5 and 6, a bracket 64 is attached to and extends out from the proximal side of the sidecar 60 and includes a pair of vertically spaced rearwardly directed slots 66. The slots 66 matingly engage a vertical rod 68 attached to the rear fork 22 and brace 29.

Figures 10, 11:
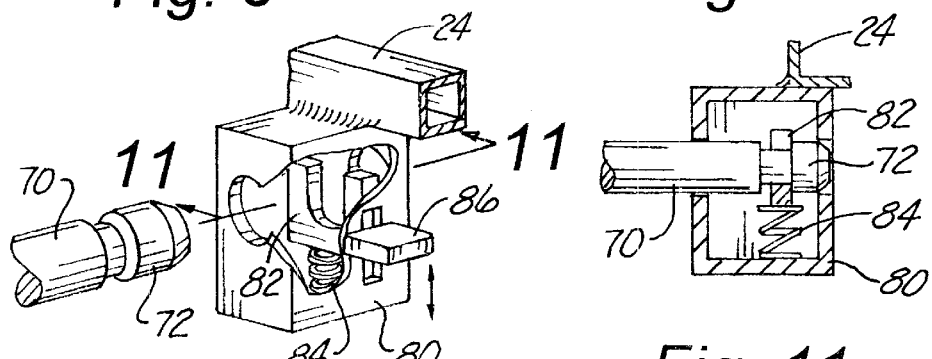
FIG. 10 is a greatly enlarged partial perspective view with portions cut-away to illustrate the engagement of the front locking pin on the sidecar with the socket on the vehicle.
FIG. 11 is a side elevation sectional view showing the locking pin secured in the socket.

Also, as best shown in FIGS. 8–11, a locking pin 70 is attached to and extends out from the proximal side of the sidecar 60 and includes an enlarged head 72. The locking pin 70 is matingly received in a socket 80 attached to the tube 24 of the rear portion 20 of the frame. The socket 80 includes a yoke 82 that is upwardly biased by spring 84. The yoke 82 is movable between a first upper locked position in engagement with the enlarged head 72 of locking pin 70 (FIG. 11), and a lowered unlocked position disengaged from the enlarged head 72 of pin 70 (FIG. 10). The yoke 82 is lowered against the force of spring 84 by moving the lever 86 downwardly.

In operation, the bicycle 10 is adjusted to accommodate riders of different sizes by adjusting the relative positions of tubes 24 and 42 and securing them in a selected position as illustrated in FIGS. 2 and 3. Likewise, the sidecar 60 is quickly and easily attached by engagement of the slots 66 and the locking pin 70 on the sidecar 60, with the vertical rod 68 and the socket 80 on the rear portion 20 of the frame of the bicycle 10.

It can be seen that no tools are needed to adjust the length of the bicycle 10 to accommodate different riders, or to attach or remove the sidecar 60. The design allows easy steering with the sidecar 60 attached, and allows for side-by-side seating of the operator and the passenger.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

What is claimed is:

1. An operator-powered wheeled vehicle, comprising:
   a frame including a rear portion having a rear fork and a substantially horizontal seat extending forward of the rear fork, and a front portion having an upwardly extending support with a sleeve at the upper end, the rear and front portions of the frame being telescopically connected and being movable with respect to each other between an extended position and a retracted position;
   a rear wheel rotatably attached to the rear fork;
   a shaft pivotally received in the sleeve, the shaft having an upper end attached to steering handle bars, and a lower end attached to a front fork;
   a bracket attached to and extending outwardly from the front fork;
   a rotatable pedal crank attached to the bracket;
   a front wheel rotatably attached to the front fork, and being drivably connected to the pedal crank by a continuous drive chain;
   a sidecar releasably attached to the rear portion of the frame, the sidecar having a proximal side attached to the frame and a distal side supported by a rotatable ground wheel;
   a bracket attached to and extending out from a rear section of the proximal side of the sidecar, the bracket including a rearwardly directed slot;
   a locking pin attached to an extending out from a forward section of the proximal side of the sidecar;
   a vertically disposed rod operably attached to the rear portion of the frame, the rod being disposed to matingly receive the slot of the bracket; and
   a socket attached to the rear portion of the frame and being disposed to matingly receive the locking pin.

2. The operator-powered wheeled vehicle of claim 1 wherein the rear portion of the frame and the front portion of the frame are secured in a selected position by engagement of a pin in registerable openings in the rear and front portions of the frame.

3. The operator-powered wheeled vehicle of claim 1 further including a seat back attached to the rear portion of the frame and being disposed to extend upwardly therefrom.

4. The operator-powered wheeled vehicle of claim 2 further including a seat back attached to the rear portion of the frame and being disposed to extend upwardly therefrom.

5. The operator-powered wheeled vehicle of claim 1 wherein the bracket includes a pair of vertically spaced rearwardly directed slots, and wherein the vertically disposed rod matingly receives the pair of slots.

6. The operator-powered wheeled vehicle of claim 1 wherein the locking pin includes an enlarged head, and the socket includes a spring biased yoke movable between a first locked position in engagement with the enlarged head of the locking pin, and a second unlocked position disengaged from the enlarged head of the locking pin.

7. The operator-powered wheeled vehicle of claim 5 wherein the locking pin includes an enlarged head, and the socket includes a spring biased yoke movable between a first locked position in engagement with the enlarged head of the locking pin, and a second unlocked position disengaged from the enlarged head of the locking pin.

* * * * *